United States Patent [19]
Hurley et al.

[11] Patent Number: 4,987,489
[45] Date of Patent: Jan. 22, 1991

[54] APPARATUS FOR GENERATING AN INTERLACED SLOW MOTION VIDEO OUTPUT SIGNAL BY SPATIAL AND TEMPORAL INTERPOLATION

[75] Inventors: Terry R. Hurley, Newbury, England; Naoki Nishio, Hadano, Japan

[73] Assignee: Sony Corporation, Tokyo, Japan

[21] Appl. No.: 403,479

[22] Filed: Sep. 6, 1989

[30] Foreign Application Priority Data

Sep. 21, 1988 [GB] United Kingdom ............... 8822186

[51] Int. Cl.⁵ .............................................. H04N 7/01
[52] U.S. Cl. .................................... 358/105; 358/11; 358/140
[58] Field of Search ................... 358/105, 140, 11, 12, 358/136

[56] References Cited

U.S. PATENT DOCUMENTS 4,400,719  8/1983  Powers ........................... 358/140 X
4,768,092  8/1988  Ishiwaka ............................ 358/105

FOREIGN PATENT DOCUMENTS 0018856  11/1980  European Pat. Off. .
0065365  11/1982  European Pat. Off. .
0279549   8/1988  European Pat. Off. .
0294958  12/1988  European Pat. Off. .
0311268   4/1989  European Pat. Off. .
3613230  10/1986  Fed. Rep. of Germany .
1525915   9/1978  United Kingdom .
2050109  12/1980  United Kingdom .
2098021  11/1982  United Kingdom .

OTHER PUBLICATIONS

IEEE Transactions on Circuits and Systems, vol. CAS-34, No. 11, Nov. 1987, pp. 1432-1439, New York, G. Schamel, "Pre- and Postfiltering of HDTV Signals for Sampling Rate Reduction and Display Up-Conversion".

Primary Examiner—Victor R. Kostak
Attorney, Agent, or Firm—Alvin Sinderbrand

[57] ABSTRACT

In a slow motion video generation apparatus; successive fields of an input video signal are stored in field stores, a spatial interpolator spatially interpolates between lines of a field selected from those stored in the field stores to produce a spatially interpolated video signal, a temporal filter carries out temporal interpolation between a pair of fields of the same interlace polarity selected from those stored in the field stores to produce a temporally filtered video signal, a combining device selectively receives the spatially and temporally interpolated video signals, and a movement indicator compares the fields stored in the field stores to detect whether or not there is local movement in the picture represented by the stored fields and controls the combining device so that the output signal is substantially wholly constituted by the temporally interpolated video signal in picture areas where substantially no movement is detected and is substantially wholly constituted by the spatially interpolated video signal in picture areas where more than a predetermined amount of movement is detected.

21 Claims, 5 Drawing Sheets

APPARATUS FOR GENERATING AN INTERLACED SLOW MOTION VIDEO OUTPUT SIGNAL BY SPATIAL AND TEMPORAL INTERPOLATION

BACKGROUND OF THE INVENTION

1. Field of the Invention

This invention relates to slow motion video signal generation.

A slow motion video (television) signal is generated by increasing the number of fields of the original signal and displaying the resultant signal at the same field frequency as the original signal whereby an illusion of slowed motion is obtained. Conventionally, the increase in the number of fields is obtained by repeating fields of the original signal. If a repeated field is to be of the same interlace polarity, no alteration of the field is effected. If a repeated field is to be of opposite interlace polarity, it may be subjected to spatial interpolation (i.e. spatial interpolation between the lines thereof), to change its interlace polarity. Such spatial interpolation may be effected in a fixed direction. For example, the spatial interpolation may be effected in a purely vertical direction, i.e. it may comprise vertical line averaging performed, for example, by a ½:½ spatial (vertical) filter. This technique of fixed direction (e.g. vertical) spatial interpolation is subject to the following disadvantages.

1. There is a loss of apparent vertical resolution in that, due to the interlaced field system, each field contains only half of the vertical information of the picture. The loss of apparent vertical resolution gets worse as to speed is reduced until, at the limit, when the picture is still, half of the vertical resolution is lost.

2. There is an increase in apparent vertical aliasing due to the absence of a vertical prefilter prior to repetition of interlaced fields to prevent all spectral components above the Nyquist limit from being sampled.

3. The fact that some fields are subjected to spatial interpolation to change the interlace polarity, and some are not, gives rise to a beating effect which increases flicker of the displayed picture. This effect is particularly objectionable at slow motion speeds which are close to the original (normal) speed.

An alternative technique to field repetition which could, in principle, be used, would be to generate a new series of fields by linear temporal interpolation between the fields of the original signal. This, however, would require the use of prefilters in the vertical and temporal directions to prevent all spectral components above the Nyquist limit from being sampled, and therefore to prevent aliasing. This limitation on the spatial/temporal resolution would cause severe subjective impairments on picture motion, which would be seen as picture blur. Thus, this technique cannot by itself provide satisfactory results.

2. Description of the Prior Art

International (PCT) Patent Applications Publication Nos. WO85/02080 and WO85/04542 disclose the use of a movement detector in a television signal processing apparatus. WO85/02080 is concerned with "upconverting" an interlaced signal to a non-interlaced format in a satellite broadcast receiver, which is done by interpolating extra lines which are combined with the lines of the input field to provide a non-interlaced output. A movement detector monitors delayed lines and fields of the input signal and produces a signal which is applied to a field store processor which in turn produces a control signal for an interpolator (for interpolating the extra lines). WO85/02080 mentions that the movement detector can be based on an absolute frame difference signal; and mentions also that, in upconverting an interlaced signal, temporal interpolation is better when there is no movement, because it does not detract from vertical resolution, and that vertical interpolation is better in the case of movement, but causes loss of vertical resolution when there is no movement. WO85/04542 is concerned with the same type of system, and is concerned more specifically with the structure of the movement detector, which generates an absolute frame difference signal. Neither of the above documents is concerned with the provision of a slow motion system, in which, due to the fact that the display is in slow motion, generally for the purpose of close examination of viewers (e.g. to see who has won a running race), any degradation in picture quality will be more readily seen than in the case of a normal speed picture.

SUMMARY OF THE INVENTION

The present invention provides a slow motion video signal generation apparatus comprising:

storage means for storing a plurality of successive fields of an input video signal from which an interlaced slow motion video output signal is to be derived;

spatial interpolation means for spatially interpolating between lines of a field selected, for each field of the slow motion video output signal, from those stored in the storage means to produce a field of a spatially interpolated video signal;

temporal filter means for carrying out linear temporal interpolation between a pair of fields of the same interlace polarity selected, for each field of the slow motion video output signal, from those stored in the storage means to produce a field of a temporally interpolated video signal;

control means for carrying out said selection of the fields stored in the storage means to be supplied to the spatial interpolation means and to the temporal filter means for the production of each field of the slow motion video output signal;

combining means for receiving the spatially interpolated video signal and the temporally interpolated video signal and for producing the slow motion video output signal therefrom; and a movement indicator operative to compare the fields stored in the storage means to detect whether or not there is local movement in the picture represented by the stored fields and responsive thereto to control the combining means such that the slow motion video output signal is substantially wholly constituted by the temporally interpolated video signal in picture areas where substantially no movement is detected and is substantially wholly constituted by the spatially interpolated video signal in picture areas where more than a predetermined amount of movement is detected.

The apparatus employs a simple form of adaptive signal processing in that the movement indicator differentiates between stationary and moving parts of the picture, which can then be treated in different ways. Thus, in stationary or near-stationary areas, new picture information is obtained by linear interpolation between samples which are mutually temporally displaced (i.e. are in different fields), which is possible because in areas of no or low movement a sample of the slow motion output signal can be based on the values of samples of the output signal which are in the same spatial position but displaced in time, whereas in areas where more than a predetermined amount of movement is taking place new picture information is derived from an interpolation of samples that are mutually spatially displaced in the same field of the input signal, which is possible because, in such areas, a sample of the slow motion output signal can be based on the values of samples which are in the same (preferably the nearest) temporal position but are displaced spatially.

Thus, full vertical resolution should be obtainable on stationary areas of the picture, since temporal interpolation is used in those areas. Also, no increase in vertical aliasing should be experienced on stationary areas of the picture, since spatial interpolation is not used in those areas. Further, the above-described problem which causes flicker beating to occur in the case of the above-described prior technique is avoided.

With the adaptive arrangement in accordance with the invention, it may also be possible to employ local aperture correction to reduce blur in areas of movement.

The combining means could be so controlled as to switch between producing the slow motion video output signal substantially wholly from the temporally interpolated video signal to producing it substantially wholly from the spatially interpolated video signal when more than a predetermined amount of movement is detected. Preferably, however, the combining means comprises mixing means capable of mixing the spatially interpolated video signal and the temporally interpolated video signal at a variable mixing ratio to produce the slow motion video output signal, and the movement indicator is operative to control the mixing ratio such that the proportion of the spatially interpolated video signal forming the slow motion video output signal increases gradually with an increase in detected movement from substantially zero when substantially no movement is detected to substantially unity when more than said predetermined amount of movement is detected. The aforesaid increase, while it could be of a stepwise nature, is preferably of a continuous nature, e.g. rectilinear or curvilinear.

The invention also provides a method of generating a slow motion video signal, the method comprising:
storing a plurality of successive fields of an input video signal from which an interlaced slow motion video output signal is to be derived;
spatially interpolating between lines of a field selected, for each field of the slow motion video output signal, from the stored fields to produce a field of a spatially interpolated video signal;
linearly temporally interpolating between a pair of fields of the same interlace polarity selected, for each field of the slow motion video output signal, from those stored in the storage means to produce a field of a temporally interpolated video signal;
combining the spatially interpolated video signal and the temporally interpolated video signal to produce the slow motion video output signal; and
comparing the stored fields to detect whether or not there is local movement in the picture represented by the stored fields and controlling the combining of the spatially and temporally interpolated video signals such that the slow motion video output signal is substantially wholly constituted by the temporally interpolated video signal in picture areas where substantially no movement is detected and is substantially wholly constituted by the spatially interpolated video signal in picture areas where more than a predetermined amount of movement is detected.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
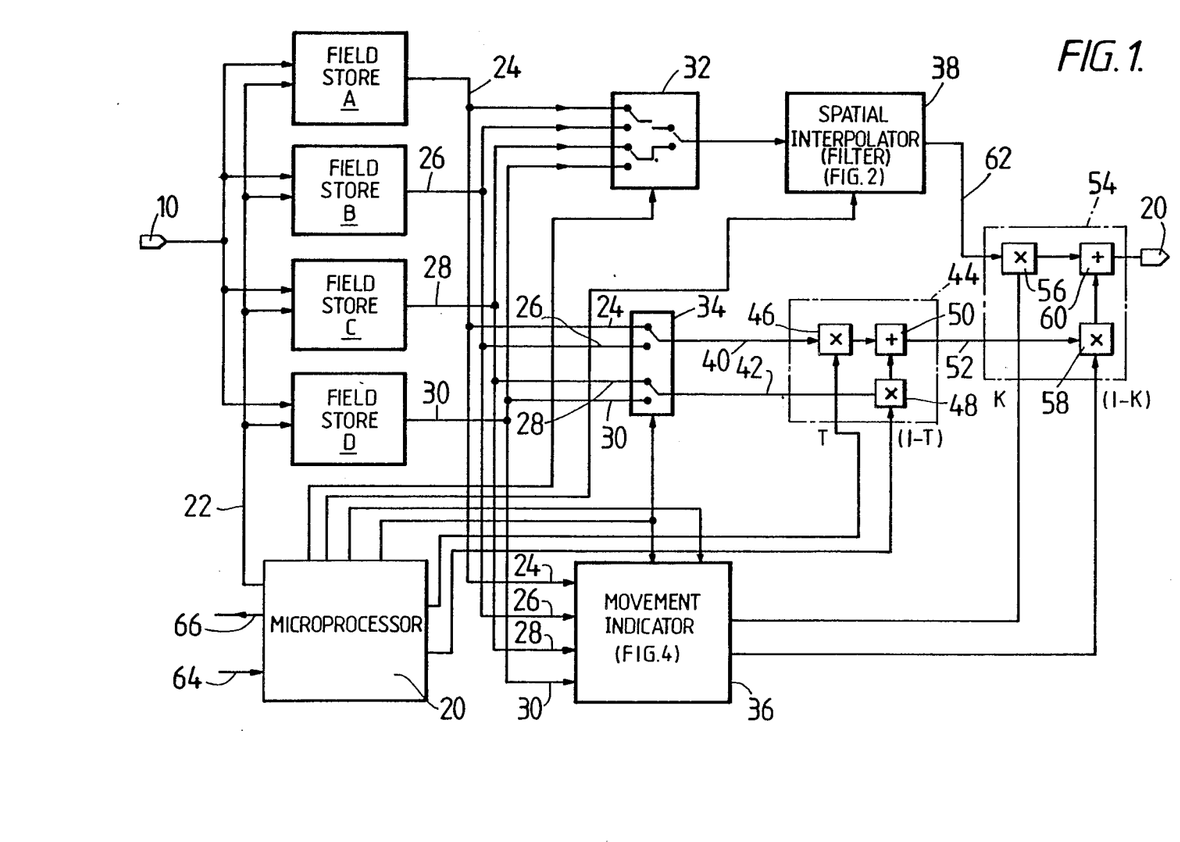
FIG. 1 is a block schematic view of a slow motion video signal generation apparatus embodying the invention.

FIG. 1 shows a slow motion video signal generation apparatus that converts a digital input video signal in the form of input video data supplied to an input 10 to a digital output slow motion video signal (output video data) available at an output 20. The output video data is in a standard format. That is to say, it may for example comprise 525 lines per frame and have a field frequency of 60 Hz or may comprise 625 lines per frame and have a field frequency of 50 Hz. Since the input video data also usually will have been devized from a video signal of standard format, that signal usually will have to be slowed by recording means (not shown) disposed upstream of the input 10 so that it is supplied to the input 10 at a field frequency or average field frequency which is less than the output field frequency (hereinafter referred to also as "the reference field frequency") by a factor determined by the reduction in speed (in the forward or reverse direction) effected by the apparatus. (This is explained more fully below).

The apparatus includes a microprocessor 20 which is programmed to produce various signals to control the operation of the apparatus as described below, and four field stores A to D connected to the input 10. By way of a control bus 22, the microprocessor 20 controls writing of the input video data from the input 10 into the field stores A to D such that, at any instant in time, four consecutive fields (hereinafter also referred to as "input fields") of the digital input video signal are stored in the respective field stores A to D. The four consecutive fields are those temporally symmetrical about the point in time (with respect to the output data) at which the apparatus is working. In more detail, the field stores A to D may, at some arbitrary time, store four successive fields F1 to F4, respectively. When the apparatus subsequently needs access to the set of four successive fields consisting of the fields F2 to F4 and a field F5 (which is subsequent to F4 if the apparatus is providing slow motion in the forward direction or prior to F1 if the apparatus is providing slow motion in the reverse direction), the field F5 is written into the field store A in place of the field F1. Similarly, a field F6 will at a later time be written into the field store B in place of the field F2; and so on.

Figure 4:
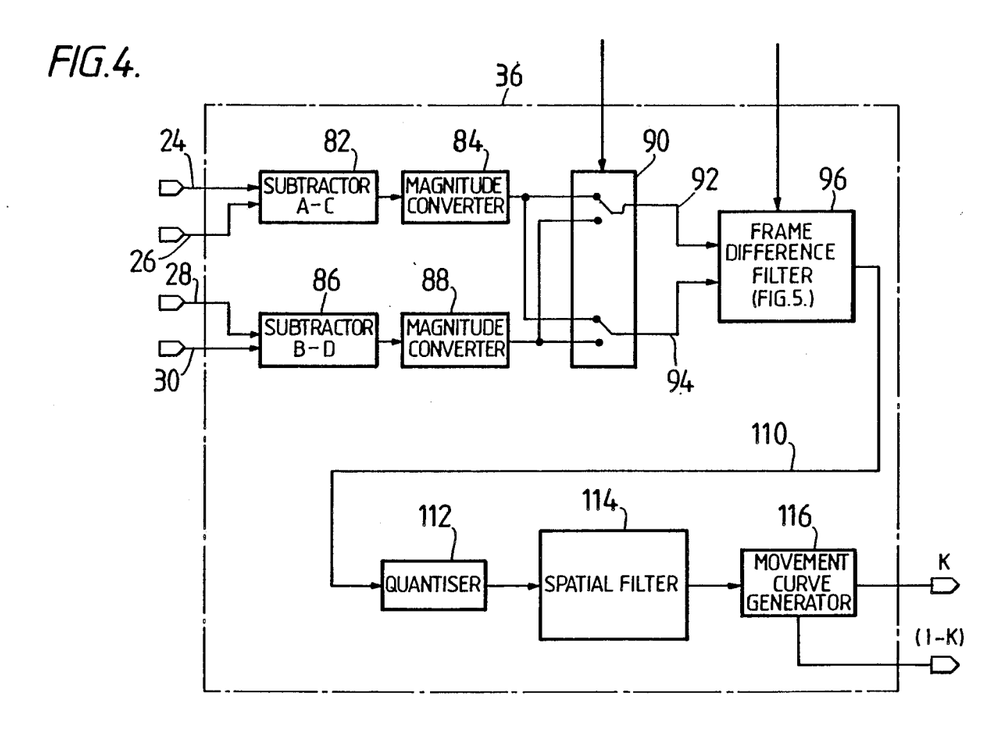
FIG. 4 is a block schematic view showing in more detail a movement indicator shown in FIG. 1.

By way of busses 24, 26, 28, 30, outputs of the field stores A to D, respectively, are connected to a selector 32, to a selector 34 and to a movement indicator 36 (described below in more detail with reference to FIG. 4).

The microprocessor 20 applies to the selector 32 a select nearest field signal which causes the selector to connect to an output thereof, during the creation of each field of the output video data (hereinafter also referred to as an "output field"), a selected one of the busses 24, 26, 28, 30 whereby, during the generation of that output field, a corresponding selected one of the stored input fields (which is temporally nearest to the output field) is supplied to the output of the selector 32 and, from there, to a spatial interpolator or filter 38 (described below in more detail with reference to FIGS. 2A and 2B). The way in which the microprocessor 20 selects the nearest field for application to the spatial interpolator 38 during the generation of each output field is described in more detail below with reference to FIG. 7.

The microprocessor 20 also develops further signals (again as described in more detail below with reference to FIG. 7) for the generation of each output field, namely an interlace polarity signal which is applied to the spatial interpolator 38, a temporal polarity signal which is applied to the selector 34 and to the movement indicator 36, and a field polarity signal which is applied to the movement indicator 36.

The selector 34 comprises a pair of switches ganged together such that, in the illustrated position, the bus 24 (field store A) is connected to an output bus 40 and the bus 28 (field store C) is connected to an output bus 42, and, in the other position, the bus 26 (field store B) is connected to the bus 40 and the bus 30 (field store D) is connected to the bus 42. It will thus be appreciated that, during the generation of a particular output field, the busses 40 and 42 will be supplied with input fields which are of the same interlace polarity, namely either those fields stored in the field stores A and C, respectively, or those stored in the field stores B and D, respectively.

The apparatus further comprises a temporal filter or interpolator 44 which comprises two multipliers 46, 48 and an adder 50, connected together as shown. The busses 40, 42 are connected to first inputs of the multipliers 46, 48, respectively. During the generation of each output field, the microprocessor 20 generates (as described in detail below with reference to FIG. 7) a temporal coefficient T, which can range in value from zero to unity, together with the complement (I−T) thereof. The temporal coefficient T and its complement (I−T), which remain of constant value during the generation of each output field, are supplied to second inputs of the multipliers 46, 48, respectively. Consequently, during the generation of each output field, the multiplier 46 multiplies each sample of the field supplied from the field store A or C by the temporal coefficient T and the multiplier 48 multiplies each sample of the field supplied from the field store B or D by the complement (I−T). The output signals produced by the multipliers 46, 48 are added together by the adder 50 to produce a temporally interpolated output signal which is passed to a bus 52.

A further component of the apparatus is a mixer 54 which comprises two multipliers 56, 58 and an adder 60, connected together as shown. A bus 62 supplies a spatially interpolated output signal developed by the spatial interpolator 38 to a first input of the multiplier 56, and the bus 52 supplies the temporally interpolated output signal developed by the temporal filter 44 to a first input of the multiplier 58. During the generation of each output field, the movement indicator 36 generates a movement coefficient K, which can range in value from zero to unity, together with its complement (I−K). The value of K can vary during the generation of each output field, depending upon local movement of the picture represented by the fields supplied to the movement indicator 36 from the field stores A to D, as detected by the movement indicator 36. The movement coefficient K and its complement (I−K) are supplied to second inputs of the multipliers 56, 58, respectively. Consequently, during the generation of each output field, the multiplier 56 multiplies each sample of the spatially interpolated video signal (supplied thereto on the bus 62 from the spatial interpolator 38) by the current value of the movement coefficient K and the multiplier 58 multiplies each sample of the temporally interpolated video signal (supplied thereto on the bus 52 from the temporal filter 44) by the current value of the complement (I−K). The output signals produced by the multipliers 56, 58 are added together by the adder 60 to produce the slow motion video output signal which is passed to the output 20 of the apparatus. It will therefore be appreciated that the mixer 54 mixes together the spatially interpolated video signal and the temporally interpolated video signal to produce the slow motion video output signal, the mixing ratio at any one time being determined by the current value of the movement coefficient K. If K=0 (no movement detected) the slow motion output video signal is constituted wholly by the temporally interpolated video signal, the proportion of the slow motion output video signal formed by the spatially interpolated video signal being zero. As K is gradually increased, the proportion of the slow motion output video signal formed by the spatially interpolated video signal increases gradually until, when K=1, the proportion of the slow motion output video signal formed by the spatially interpolated video signal is unity (and the proportion of the slow motion video output signal formed by the temporally interpolated video signal is zero).

The microprocessor 20 may be provided with an input line 64 enabling input of control information, for instance an indication by an operator of the required degree of slow motion (i.e. the ratio of slow motion speed to normal speed), which degree could be adjustable on a step-wise or continuous basis, and an indication of the required sense (forward or reverse) of the slow motion. It would, however, be possible for the apparatus to provide only a fixed degree of slow motion, in which case no such operator control option need be provided.

Further, the microprocessor 20 may be provided with an output control line 66 connected to the above-mentioned recording means (not shown) disposed upstream of the apparatus input 10 to control the speed or average speed at which the input video data is supplied to the input 10 to adopt a value consonant with the speed (reduced with respect to normal speed) at which the input video data needs to be written into the field stores A to D. It should be appreciated, in this regard, that the apparatus can function to provide slow motion in either a forward or reverse direction, whereby the microprocessor 2 could be configured to call for the fields of input video data to be supplied in either the normal order (originally recorded order) or in a reverse order. (That is to say, if the normal speed is V, the apparatus can provide an output signal having a speed which is anywhere between $+V$ and $-V$, including zero (still picture).) The recording means could, for example, be a video tape recorder (VTR) capable of playing back at reduced speed (relative to normal speed) in either direction, in which case the microprocessor 20 could control the playback speed to adopt a value in which the fields of the input signal curve at the correct (slowed) timing. Instead, the recording means could comprise a large random access memory (RAM) capable of storing a segment equal to, say, five seconds, of an input digital video signal (as described in UK Patent Application Publication No. GB-A-2 201 314—Sony Corporation), in which case the microprocessor 20 could cause fields to be read from the RAM into the field stores A to D as required (in either direction).

The spatial interpolator (filter) 38 effects spatial interpolation or filtration of the signal fields supplied to it: that is, it interpolates between lines of each such field. Any form of filter suitable for this purpose can be used. One suitable form of implementing the interpolator 38, in which the spatial interpolation is effected in a vertical direction (i.e. in which interpolation is effected between mutually vertically aligned samples in different lines), will now be described with reference to FIGS. 2A and 2B. This form of the spatial interpolator 38 comprises two line delays 68, 70 connected in tandem as shown, two adders 72, 74, two multipliers 76, 78, means (not shown) for developing constant weighting coefficients C0 and C1 which are applied to the multipliers 76 and 78, respectively, a switch 80, a divide by two circuit 81 and further switches (not shown) for switching the filter into either the configuration shown in FIG. 2A or that shown in FIG. 2B. (In this regard, it is considered clearer to show the configurations separately rather than to show a complete diagram, including all the switches, and explain the different configurations). The line delays 68, 70 effect a delay equal to one line (1H), that is to the delay (1H) between two successive lines of a field (rather than a frame), for example 64 microseconds in the case of PAL (312.5 lines per field with a field frequency of 50 Hz).

The different configurations of the spatial interpolator 38 are adopted, during the generation of each output field, in accordance with the interlace polarity signal applied to the spatial interpolator by the microprocessor 20. The interlace polarity signal performs two functions. Firstly, it tells the spatial interpolator 38 whether or not the interlace polarity of the nearest input field selected by the selector 32 is the same as the interlace polarity desired for the output field (in which regard it should be appreciated that the slow motion output signal, being of a conventional format, should have alternate fields of opposite interlace polarity). If the interlace polarities are the same, the configuration of FIG. 2A is adopted, whereas if the polarities are different, the configuration of FIG. 2B is adopted. The configuration of FIG. 2B changes the interlace polarity of the selected input field to conform to the desired polarity. The second function performed by the interlace polarity signal is that, if the interlace polarities differ (and therefore an interlace polarity change is needed) the interlace polarity signal tells the spatial interpolator 38 in what sense they differ whereby the interpolator will be aware in which sense (from even to odd or from odd to even) a change is needed.

Figure 2A:
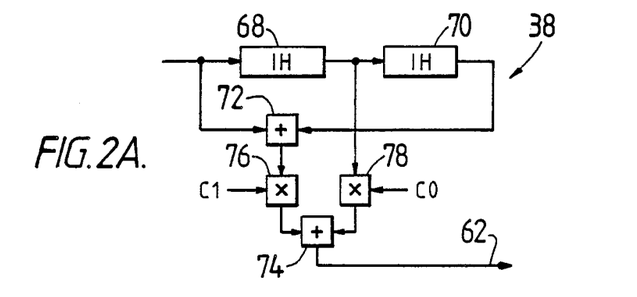
FIGS. 2A and 2B show respective different configurations that can be adopted by a spatial (vertical) interpolator or filter of the apparatus of FIG. 1.
Figure 3A:
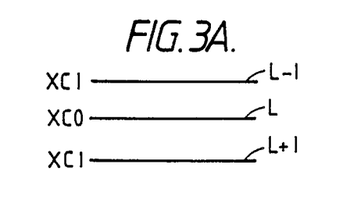
FIGS. 3A and 3B are schematic representations showing how lines of a video signal field are combined by the spatial interpolator when in the configurations of FIGS. 2A and 2B, respectively.

In the configuration of FIG. 2A (where a change in interlace polarity is not required), the adders 72, 74 and multipliers 76, 78 act as a combining means connected to the junction and to the opposite ends of the tandem-connected line delays 68, 70 whereby the spatially interpolated video output signal on the bus 62 is a combination of three lines of the input field supplied from the selector 32 and is of the same interlace polarity. More specifically, referring to FIG. 3A, which shows three lines $L-1$, L and $L+1$ of the input field, where L is the line currently appearing at the junction of the line delays 68, 70, a line of the output field is being formed by combining each sample of the line L (multiplied by the weighting coefficient C0) with vertically adjacent samples (each multiplied by the weighting coefficient C1) of the lines $L-1$ and $L+1$ immediately above and below the line L, the line of the output field having the same position in that field as the line L has in the input field because there is to be no change in interlace polarity.

Figure 2B:
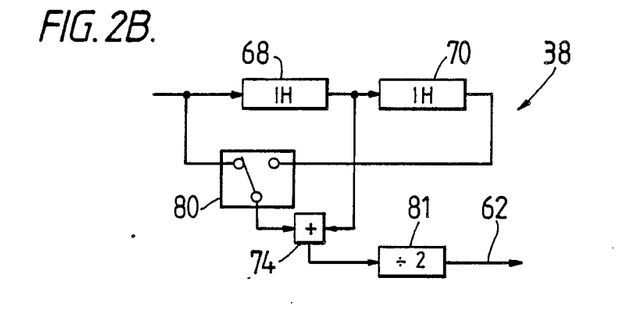
Figure 3B:
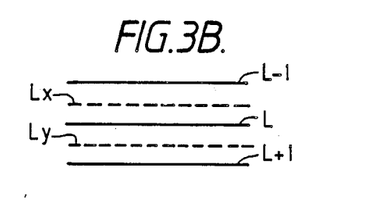

In the configuration of FIG. 2B (where a change in interlace polarity is required), the adder 74 is connected between the ends of one or the other of the line delays 68, 70, namely the line delay 68 when the switch 80 is in the illustrated position and the line delay 70 when the switch 80 is in the other position. (Also, the divide by two circuit 81 is incorporated in the integrator circuit where shown to reduce its gain to unity.) In each case, therefore, vertical interpolation is effected between two lines only of the input field to generate a vertically interpolated line of opposite interlace polarity. In both positions of the switch 80, the signal applied to the right hand input of the adder 74 (namely the signal present at the junction between the line delays 68, 70) is delayed by one line (1H), by means of the line delay 68, with respect to the input. However, the signal applied to the left hand input of the adder 74 is delayed by either 0H or 2H, depending upon the position of the switch 80. That is, referring to FIG. 3B, which shows three lines $L-1$, L and $L+1$ of the input field, where L is the line currently appearing at the junction of the line delays 68, 70, a line of the output field is being formed by combining each sample of the line L with either a vertically adjacent sample of the line $L-1$ or a vertically adjacent sample of the line $L+1$, depending upon the position of the switch 80. Thus, the output field line is either that shown in FIG. 3B at Lx or that shown in FIG. 3B at Ly. Both the lines Lx and Ly are of opposite interlace polarity to the lines of the input field, but the line Lx is above the line L and the line Ly is below the line L. Thus, changing the position of the switch 80 enables the configuration of FIG. 2B to change the interlace polarity of the input field in either sense, that is from even to odd, or odd to even, to conform to the desired interlace polarity of the output field.

The movement indicator 36 will now be described in more detail with reference to FIG. 4. During the generation of each output field, the busses 24, 26, 28, 30 supply all four of the consecutive input fields stored in the field stores A to D to the movement indicator 36. A first subtractor 82 forms a first frame difference signal A−C on a sample by sample basis from the samples of the fields stored in the field stores A and C (which are both of one interlace polarity) and a first magnitude converter 84 discards the sign of the first frame difference signal to form therefrom a first absolute frame difference signal |A−C|. Similarly, a second subtractor 86 forms a second frame difference signal B−D on a sample by sample basis from the samples of the fields stored in the field stores B and D (which are both of the other interlace polarity) and a first magnitude converter 88 discards the sign of the second frame difference to form therefrom a second absolute frame difference signal |B−D|.

Both the first and second absolute frame difference signals |A−C| and |B−D| are supplied to a selector 90 which is controlled by the above-mentioned temporal polarity signal which is produced by the microprocessor 20 and which is used also to control the selector 34. The selector 90 operates such that either (i) the first absolute frame difference signal |A−C| is passed to an output bus 92 and the second absolute frame difference signal |B−D| is passed to an output bus 94, or (ii) the second absolute frame difference signal |B−D| is passed to the bus 92 and the first absolute frame difference signal |A−C| is passed to the bus 94. The temporal polarity signal causes the selector 90 to position itself, for the generation of each output field, such that the absolute frame difference signal formed from the stored fields of the same interlace polarity as the desired interlace polarity of the output field is applied to the bus 94 (and the other absolute frame difference signal is applied to the bus 92).

Figure 5:
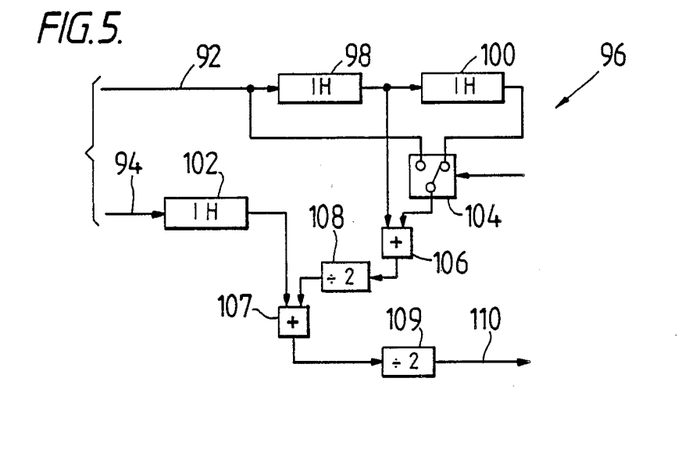
FIG. 5 is a block schematic view showing in more detail a frame difference filter of the movement indicator of FIG. 4.

The busses 92 and 94 are connected to respective inputs of a frame difference filter 96, shown in more detail in FIG. 5. As shown in FIG. 5, the frame difference filter 96 comprises three line delays (1H) 98, 100, 102, a switch 104, two adders 106, 107 and two divide by two circuits 108, 109, all connected together as shown. (The divide by two circuits 108, 109 serve to keep the gain of the filter 96 equal to unity.) The switch 104 is controlled by the above-mentioned field polarity signal generated by the microprocessor 20, which signal performs the same function as the above-described second function of the interlace polarity signal applied to the spatial interpolator 38 and used to indicate in what sense an interlace polarity change is needed. In fact, as will be appreciated from a comparison of FIG. 2B and FIG. 5, the components 98, 100, 104, 106 and 108 of FIG. 5 are configured in the same manner as the components 68, 70, 80, 74 and 81 of FIG. 2A and function in a like manner. That is, they effect, on a sample by sample basis, vertical interpolation or filtration between two adjacent lines of the absolute frame difference signal (either |A−C| or |B−D|) on the bus 92 to produce, at the output of the adder 106, a signal which has been vertically shifted by ½H (in either sense, depending upon the position of the switch 104) to correspond in vertical position (interlace polarity) to the other absolute frame difference signal (either |B−D| or |A−C|) on the bus 94 (after passage through the line delay 102). Thus, the respective processed absolute frame difference signals as applied to the respective inputs of the adder 107 correspond to the same vertical position whereby the output signal of the adder 107 corresponds to an absolute frame difference at precisely the same spatial position as averaged over two successive (interlaced) frames of the stored input video signal. Thus, the frame difference filter 96 combines the first and second absolute frame difference signals |A−C| and |B−D| supplied thereto to produce, on an output bus 110, on a sample by sample basis, a signal whose magnitude is representative of frame difference, and therefore of movement. This signal may then, in the interest of hardware reduction, be passed through a quantiser 112, as shown in FIG. 4, to reduce the number of bits.

It should be appreciated that the frame difference represented by the signal on the bus 110 could represent noise, as well as movement. Thus, if a significant amount of noise is present, inaccuracy could be introduced. To deal with this problem the signal may be passed through a spatial filter 114 (e.g. a 3×3 filter) to reduce noise, whereby the filtered frame difference signal outputted by the spatial filter 114 will suffer less from any inaccuracy introduced by frame difference caused by noise and thus reflect more accurately frame difference due to movement.

Figure 6A:
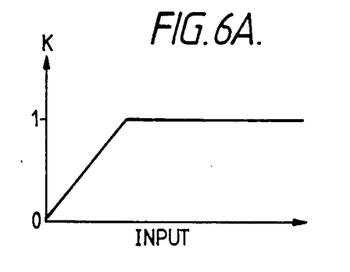
FIGS. 6A and 6B show respective examplary movement curves produced in the movement indicator of FIG. 4.
Figure 6B:
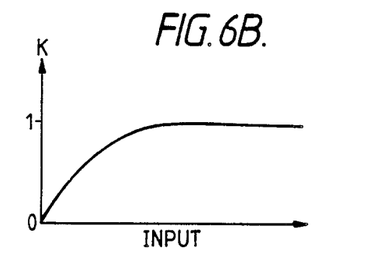

The noise-reduced frame difference signal outputted by the spatial filter 114 is passed to a movement curve or transfer function generator 116 to generate the above-described movement coefficient K (and its complement (1−K)). The precise optimum nature of the movement curve will depend upon the nature of the source or capture mechanism (e.g. tube camera or CCD camera) originally used to acquire the video signal. Two possible examples are shown in the graphs presented as FIGS. 6A and 6B, respectively, in each of which the vertical axis represents the value of K and the horizontal axis represents the magnitude of the input signal applied to the movement curve generator 116. In each case, the value of K rises gradually and continuously from zero (rectilinearly in the case of FIG. 6A and curvilinearly in the case of FIG. 6B) as the value of the input (movement-representative) signal increases from zero until it reaches a value of unity and stays at that value after the value of the input signal has exceeded a predetermined value corresponding to the detected movement having attained a value at which it is clear that temporal filtration or interpolation will be unsatisfactory whereby only spatial interpolation should be employed.

Figure 7:
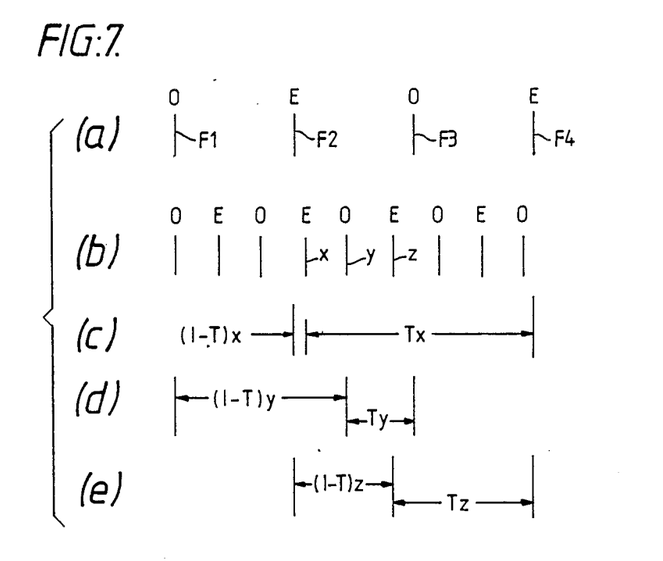
FIG. 7 is a highly schematic representation of fields of an input video signal applied to the apparatus of FIG. 1 and of fields of a slow motion video output signal produced by the apparatus of FIG. 1.

The operation of the above-described apparatus will now be described in more detail with reference to FIG. 7. In FIG. 7, the fields of the input video signal stored in the field stores A to D are shown at (a) and the fields of the slow motion video output signal produced therefrom are shown at (b). The fields are, in both cases, shown for clarity as vertically-extending lines appearing at respective instants of time, which is not of course the case since they have respective durations and are substantially temporally contiguous. In reality, the vertically-extending lines shown at (a) and (b) in FIG. 7 can be considered to be the starting times of the fields, but these lines will nonetheless be referred to as fields for the sake of clarity and simplicity.

As explained above, the slow motion output video signal will conform to a desired format whereby the temporal spacing between the output fields as shown in FIG. 7 at (b) will be, for example, 1/60 of a second or 1/50 of a second. Originally, the input fields were separated by the same temporal spacing. However, due to the slow motion, the temporal spacing between the input fields has been increased, in terms of picture content, relative to the output fields, by an extent equal to the degree of slow motion. (That is, for example, if the degree of slow motion is 1:2 the temporal spacing between the input fields, at least as related to the output fields in terms of picture content, has been increased by a factor of 1:2.) Thus, the temporal relationship between the input and output fields as shown at (a) and (b), respectively, in FIG. 7 is true, the timescale in each case being the same. (In FIG. 7, the degree of slow motion is represented, purely arbitrarily, as about 1:2.2.)

In the input signal, successive fields are of course of opposite interlace polarity, namely even or odd. Clearly, the fields of the output signal also are to be of successively opposite interlace polarity. The interlace polarities of the fields shown at (a) and (b) in FIG. 7 are represented as being even (E) or odd (O).

A description will now be given of how the apparatus operates to produce the output fields designated X, Y and Z at (b) in FIG. 7. The description assumes that the output fields X, Y and Z will be produced in that order, so as to produce slow motion in the forward direction, though it is to be recalled that they could be produced in the opposite direction to produce slow motion in the reverse direction.

The generation of each of the output fields X, Y and Z requires access to the input fields designated F1, F2, F3 and F4 in FIG. 7 at (a), which fields are assumed to be stored in the field stores A to D, respectively, in that, prior to the start of generation of the output field Y, the microprocessor 20 has caused those four fields to be written into the field stores. (The output fields prior to and subsequent to the fields X, Y and Z require access to different sets of four consecutive ones of the input fields.)

Consider first output field X. The temporally nearest input field to the output field X is the input field F2. The microprocessor 20 calculates this from a knowledge of the temporal relationship of the input and output signals. Consequently, the microprocessor 20 produces a select nearest field signal prior to the start of generating the output field X to cause the selector 32 to be configured to connect the field store containing the field F2 to the spatial interpolator 38. The interlace polarity (even) of the output field X is the same as the interface polarity (even) of the nearest input field F2. The microprocessor 20 thus produces, prior to the start of generating the output field X, an interlace polarity signal that causes the spatial interpolator 38 to adopt the configuration shown in FIG. 2A.

Since the output field X to be generated is of even (E) polarity, the microprocessor 20 sends a temporal polarity signal to the selector 34 and to the movement indicator 36, prior to the start of generating the output field X, to cause the selector 34 to supply those two of the stored fields of the same (even) interlace polarity, namely the fields F2 and F4, to be supplied to the temporal filter 44, and to cause the selector 90 of the movement indicator 36 to switch to that position in which the second absolute frame difference signal |F2−F4| is applied to the bus 94 and the first absolute frame difference |F1−F3| is applied to the bus 92. (Were the field to be generated of odd (O) polarity, the selectors 34 and 90 would be caused to adopt the irrespective opposite positions). The microprocessor 20 also generates a field polarity signal to put the switch 104 of the frame difference filter 96 of the movement indicator 36 in an appropriate position, depending upon the sense in which the part of the filter constituted by the components 98, 100, 104, 106 and 108 is operative to vertically shift the signal on the bus 92 by ½H to insure that the signals applied to the respective inputs of the adder 107 correspond to the same vertical position.

Another task to be performed by the microprocessor 20 is to calculate the temporal coefficient T (and its complement (I−T)) to be supplied to the temporal filter 44 while the output field X is generated. The values of T and (I−T) to effect linear interpolation between the temporal positions of the selected input fields F2 and F4 to the temporal location of the desired output field X are as shown at (c) in FIG. 7 (where the suffix x is applied to the values to distinguish the fact that they are specific to the output field x) and are, of course, readily calculable in terms of time units by the microprocessor 20 by simple arithmetic based on knowledge of the timing of the fields F2, F4 and X, and normalized on the basis that the spacing between the fields F2 and F4 is one unit to produce the actual values T and (I−T) to be supplied to the temporal filter 44.

The main selection operations performed by the microprocessor 20 to condition the apparatus for generating the output field X, as set out in detail above, are summarized in the first row of the following table.

TABLE

| OUTPUT FIELD | NEAREST STORED INPUT FIELD SELECTED BY SELECTOR 32 | INTERLACE POLARITY OF NEAREST STORED INPUT FIELD SAME AS THAT OF OUTPUT FIELD? | CONFIGURATION OF SPATIAL INTERPOLATOR 38 | STORED FIELDS APPLIED TO TEMPORAL INTERPOLATOR |
|---|---|---|---|---|
| X | F2 | YES | FIG. 2A | F2 & F4 |
| Y | F2 | NO | FIG. 2B | F1 & F3 |
| Z | F3 | NO | FIG 2B | F2 & F4 |

The apparatus having been configured to produce the output field X, the stored input fields F1 to F4 are then read out of the field stores A to D on a sample by sample basis, starting at the appropriate time, and applied via the busses 24, 26, 28 and 30 to the selectors 32 and 34 and to the movement indicator 36. The stored field F2 is processed by the spatial interpolator 38, the stored fields F2 and F4 are processed by the temporal filter 44, and the stored fields F1 to F4 are processed by the movement indicator 36 which produces the movement coefficient K and its complement (I−K) in accordance with detected local picture movement to control the ratio at which the spatially interpolated video signal and temporally interpolated video signal are mixed by the mixer 54 to produce the field X of the slow motion video output signal, all as described above. While this is going on, the microprocessor 20 can be performing at least some of the operations necessary for conditioning the apparatus for generating the next output field Y, for example calculating the temporal coefficient Ty and its complement (I−T)y for that output field.

The main selection operations to be performed by the microprocessor 20 to condition the apparatus for generating the output fields Y and Z are summarized in the second and third rows of the above table. The values of the temporal coefficients Ty and Tz and complements (I−T)y and (I−T)z for use when generating the output fields Y and Z are as shown in FIG. 7 at (d) and (e), respectively.

In the particular form of implementation of the spatial interpolator 38 described above with reference to FIGS. 2A and 2B, the spatial interpolation between lines of a field is effected in a (fixed) precisely vertical direction. That is, the interpolation is effected between mutually vertically aligned samples in different lines. However, the use of a spatial interpolator that effects such spatial interpolation in a vertical direction is not essential. Spatial interpolation between lines of a field in directions other than vertical can be used; and the direction of interpolation can be varied (adaptive interpolation) in accordance with a picture condition. For example, use can be made of an adaptive interpolation technique in which the direction of interpolation is varied (steered), on a sample by sample basis, in accordance with the picture content, in a sense to reduce picture degradation (particularly likely in the case of moving picture areas) caused by the spatial interpolation operation. The foregoing interpolation technique has the advantage that it may eliminate or at least reduce the disadvantages of fixed direction spatial interpolation as set out at 1. to 3. in the introduction to this specification.

The apparatus as described above will function with a monochrome digital video input signal. If the apparatus is to function with a color signal, modification will most probably be necessary in that, for various reasons, it will generally be necessary to decode a composite color signal into its luminance (Y) and chrominance (C) components in order to subject it to slow motion processing.

Figure 8:
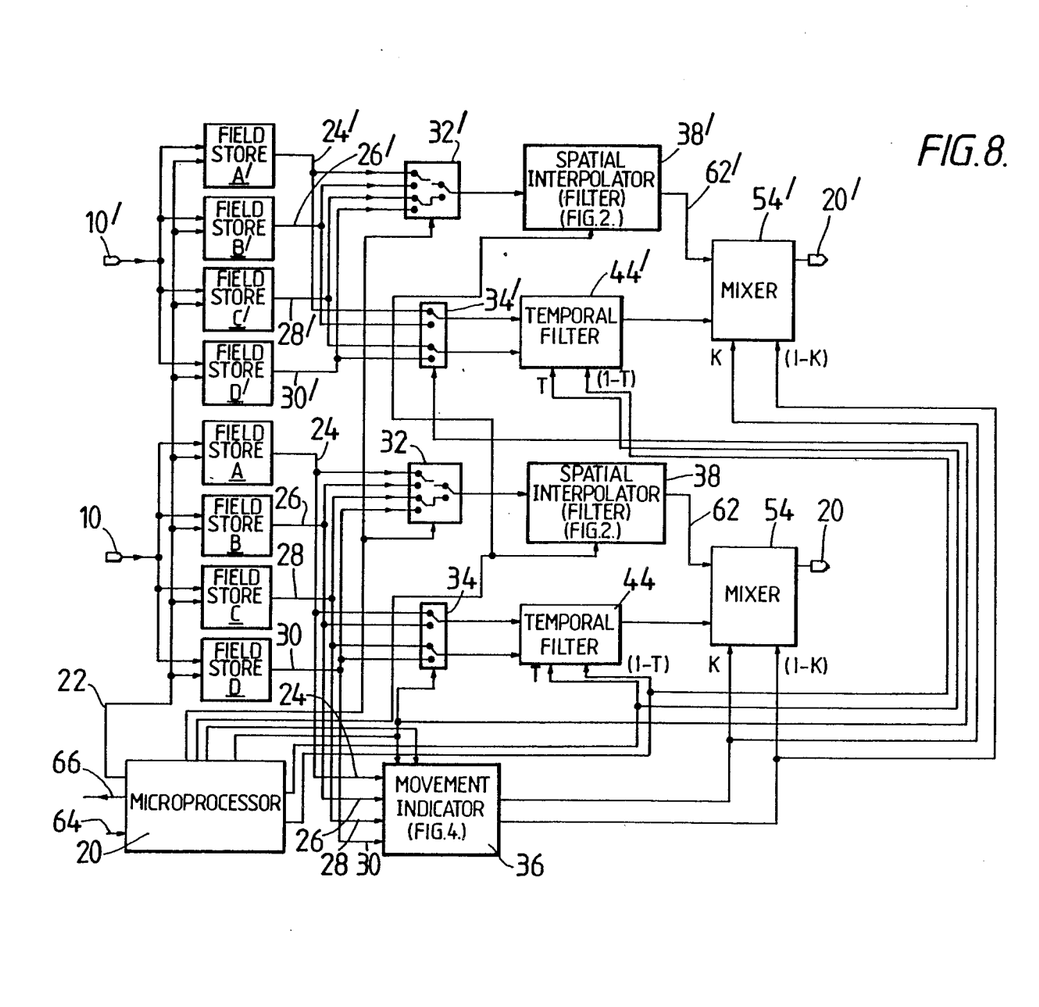
FIG. 8 shows, in a manner similar to FIG. 1, another apparatus embodying the invention for producing a slow motion video output signal which comprises separate luminance and chrominance components from a color input video signal which comprises separate luminance and chrominance components.

FIG. 8 shows one way in which the above-described apparatus may be modified to process a color signal. FIG. 8 contains many components which are the same as components shown in FIG. 1 and are designated by the same references.

A composite color digital input video signal has been decoded (in a manner known per se) into a luminance (Y) component and a chrominance (C) component. The chrominance (C) component consists in this case of two color difference signals (R−Y, B−Y) which have been demodulated to baseband, but which can be treated in one channel rather than two since the two demodulated color difference signals are multiplexed together on a sample basis (i.e. to comprise successive samples of R−Y and B−Y, which may originally have been co-sited) to form the chrominance component which can therefore be processed at the full clock rate as used for the luminance component.

The luminance (Y) component is applied to the input 10 in FIG. 8 and is processed in the same way as described above, and by the same circuit items (A to D, 20, 32, 34, 35, 38, 44 and 54) as described above, to produce on the output 20 a luminance (Y) component of the slow motion video output signal. The circuit items A to D, 20, 32, 34, 36, 38, 44 and 54, which can be considered collectively to form a luminance channel of the apparatus, are replicated in identical form as circuit items A' to D', 20', 32', 34', 36', 38', 44' and 54', which can be considered collectively to form a chrominance channel of the apparatus. The chrominance channel receives the chrominance (C) component of the digital input video signal on an input 10'. The above-recited circuit items of the chrominance channel each receive from the microprocessor 20 and movement indicator 36 the same signals that are supplied to the corresponding items of the luminance channel. The microprocessor 20 and movement indicator 36 are common to both channels, the movement indicator 36 being connected to the luminance field stores A to D (and not to the chrominance field stores A' to D'). Consequently, the chrominance channel acts in substantially the same manner as the luminance channel to produce the chrominance (C) component of the slow motion video output signal at an output 20'.

If desired, the luminance and chrominance components of the slow motion video output signal on the outputs 20 and 20' can be combined (in a manner known per se) to produce a composite output signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A slow motion video signal generation apparatus for generating an interlaced slow motion video output signal comprising:

storage means for storing a plurality of successive fields of an input video signal;

spatial interpolation means for spatially interpolating between lines of a field selected from said successive fields in said storage means to produce a field of a spatially interpolated video signal for each field of said slow motion video output signal;

temporal filter means for performing linear temporal interpolation between a pair of said successive fields in said storage means which have the same interlace polarity to produce a field of a temporally interpolated video signal for each field of said slow motion video output signal;

control means for controlling the selection of said successive fields stored in said storage means for supply to said temporal filter means and for further selecting one of said successive fields which is temporally closest to said slow motion video output signal for supply to said spatial interpolation means for each field of said slow motion video output signal;

combining means receiving said spatially interpolated video signal and said temporally interpolated video signal for producing said slow motion video output signal therefrom; and movement indicator means for comparing said successive fields stored in said storage means to detect local movement in a picture represented by said successive fields and in response to detection of said movement for controlling said combining means such that said slow motion video output signal is substantially constituted by said temporally interpolated video signal in picture areas where substantially no movement is detected and is substantially constituted by said spatially interpolated video signal in picture areas where more than a predetermined amount of movement is detected.

2. Apparatus according to claim 1, wherein said combining means comprises mixing means for mixing said spatially interpolated video signal and said temporally interpolated video signal at a variable mixing ratio to produce said slow motion video output signal, and said movement indicator means further controls said mixing ratio such that a proportion of said spatially interpolated video signal forming said slow motion video output signal increases with an increase in detected movement from substantially zero when substantially no movement is detected to substantially unity when more than said predetermined amount of movement is detected.

3. Apparatus according to claim 1, wherein
said control means further controlling a supply to said spatial interpolation means, for each field of said slow motion video output signal, of an interlace polarity signal that indicates (i) if the interlace polarity of the stored field selected for supply to said spatial interpolation means is the same as a desired interlace polarity of the field of said slow motion video output signal and, (ii) if the interlace polarity of the selected stored field and said desired interlace polarity differ, the sense in which the polarities differ; and
said spatial interpolation means in response to said interlace polarity signal has a first configuration if said interlace polarities are the same and a second configuration if said interlace polarities are different.

4. Apparatus according to claim 3, wherein
said spatial interpolation means comprises a line averaging filter including first and second line delays each having an input and an output and being connected in series;
in said first configuration, a second combining means is connected to a junction between said line delays and to said input and output of said first and second line delays, respectively, so that said spatially interpolated video signal is formed from a combination of three lines from said selected stored field supplied to said spatial interpolation means and is of the same interlace polarity as said selected stored field, and
in said second configuration, an adder is connected between a selected one of said input and output of said first and second line delays, respectively, and said junction, in which said selected one is selected in accordance with the sense of said interlace polarities so that said spatially interpolated video signal will be of said desired interlace polarity.

5. Apparatus according to claim 1, wherein said storage means stores four successive fields of said input video signal.

6. Apparatus according to claim 5, wherein said control means further controls the selection of two of the four stored fields which have the same interlace polarity as a desired interlace polarity of said field of said slow motion video output signal for supply to said temporal filter means for each field of said slow motion video output signal.

7. Apparatus according to claim 5, wherein said movement indicator means comprises first subtractor and magnitude converter means for receiving two of the four fields stored in said storage means which are of one interlace polarity to produce therefrom a first absolute frame difference signal, second subtractor and magnitude converter means for receiving the other two of said four stored fields which are of the other interlace polarity to produce therefrom a second absolute frame difference signal, and means for combining said first and second absolute frame difference signals to produce a signal representative of movement.

8. Apparatus according to claim 7, wherein said means for combining said absolute frame difference signals includes a difference filter operative for spatially filtering said absolute frame difference signals to correspond to the same vertical position so that said signal representative of movement corresponds to an absolute frame difference at said same vertical position and averaged over two successive frames.

9. Apparatus according to claim 7, wherein said movement indicator means further comprises a spatial filter for filtering said signal representative of movement to reduce noise therein.

10. Apparatus according to claim 7, wherein said combining means comprises mixing means for mixing said spatially interpolated video signal and said temporally interpolated video signal at a variable mixing ratio to produce said slow motion video output signal, and said movement indicator means further comprising a movement curve generator responsive to said signal representative of movement to produce signals for controlling said mixing ratio such that the proportion of said spatially interpolated video signal forming said slow motion video output signal increases with an increase in detected movement from substantially zero when substantially no movement is detected to substantially unity when more than said predetermined amount of movement is detected.

11. Apparatus according to claim 1, for producing said slow motion video output signal from a color input video signal which comprises separate luminance and chrominance components, wherein:
said storage means comprises first and second stores for storing said luminance and chrominance components, respectively, of said successive fields of said color input video signal;
said spatial interpolation means comprises first and second spatial interpolators for spatially interpolating said luminance and chrominance components, respectively, of the selected field to produce respective luminance and chrominance components for said field of said spatially interpolated video signal;
said temporal filter means comprises first and second temporal filters for performing linear temporal interpolation between said luminance and chrominance components, respectively, of said pair of said successive fields to produce respective luminance and chrominance components for said field of said temporally interpolated video signal;
said combining means comprises first and second combiners receiving said luminance and chrominance components, respectively, of said spatially interpolated video signal and said temporally interpolated video signal for producing respective luminance and chrominance components for said slow motion video output signal; and said movement indicator means compares said luminance components of said successive fields stored in said first store to detect local picture movement.

12. A method of generating an interlaced slow motion video output signal, the method comprising:
storing a plurality of successive fields of an input video signal from which an interlaced slow motion video output signal is to be derived;
spatially interpolating between lines of a field selected from said successive fields such that the selected field is temporally nearest to a field of said slow motion video output signal to produce a field of a spatially interpolated video signal for each field of said slow motion video output signal;
linearly temporally interpolating between a pair of said successive fields in said storage means which have the same interlace polarity to produce a field of a temporally interpolated video signal for each field of said slow motion video output signal;
combining said spatially interpolated video signal and said temporally interpolated video signal to produce said slow motion video output signal; and
comparing said successive fields to detect local movement in a picture represented by said successive fields and in response to detection of said movement for controlling said combining of said spatially and temporally interpolated video signals such that said slow motion video output signal is substantially constituted by said temporally interpolated video signal in picture areas where substantially no movement is detected and is substantially constituted by said spatially interpolated video signal in picture areas where more than a predetermined amount of movement is detected.

13. A method according to claim 12, wherein said spatially interpolated video signal and said temporally interpolated video signal are combined by mixing the interpolated video signals at a variable mixing ratio to produce said slow motion video output signal, said mixing ratio is controlled such that a proportion of said spatially interpolated video signal forming said slow motion video output signal increases with an increase in detected movement from substantially zero when substantially no movement is detected to substantially unity when more than said predetermined amount of movement is detected.

14. A method according to claim 12, further comprising:
generating, for each field of said slow motion video output signal, an interlace polarity signal that indicates (i) if the interlace polarity of the stored field selected for spatial interpolation is the same as a desired interlace polarity of the field of said slow motion video output signal and, (ii) if the interlace polarity of said selected stored field and said desired interlace polarity differ, the sense in which the polarities differ; and
performing said spatial interpolation in accordance with a first configuration if said interlace polarities are the same and in accordance with a second configuration if said interlace polarities are different.

15. A method according to claim 14, wherein
said spatial interpolation is effected by a line averaging filter comprising first and second line delays each having an input and an output and being connected in series;
in said first configuration, said spatially interpolated video signal is produced by combining signals obtained from a junction between said line delays and from said input and output of said first and second line delays, respectively, so that said spatially interpolated video signal is formed from a combination of three lines from said stored field selected for spatial interpolation and is of the same interlace polarity as said stored field selected; and
in said second configuration, said spatially interpolated video signal is produced by adding signals from a selected one of said input and output of said first and second line delays and from said junction, and in which said selected one of the input and output of the first and second line delays is selected in accordance with the sense of said interlace polarities so that said spatially interpolated video signal will be of said desired interlace polarity.

16. A method according to claim 12, in which four successive fields of said input video signal are stored.

17. A method according to claim 16, wherein, for each field of said slow motion video output signal, two of the four stored fields which have the same interlace polarity as a desired interlace polarity of said field of said slow motion video output signal are temporally filtered.

18. A method according to claim 16, wherein the step of comparing said successive fields comprises subtracting two of the four stored fields having one interlace polarity to produce therefrom a first absolute frame difference signal, subtracting the other two of said four stored fields which are of the other interlace polarity to produce therefrom a second absolute frame difference signal, and combining said first and second absolute frame difference signals to produce a signal representative of movement.

19. A method according to claim 18, wherein said first and second absolute frame difference signals are combined by means of a difference filtering operation which spatially filters said absolute frame difference signals to correspond to the same vertical position so that said signal representative of movement corresponds to an absolute frame difference at said same vertical position and averaged over two successive frames.

20. A method according to claim 18, further including the step of spatially filtering said signal representative of movement to reduce noise therein.

21. A method according to claim 12, in which said interlaced slow motion video output signal is a color video signal which comprises luminance and chrominance components and said input video signal is a color input video signal which comprises separate luminance and chrominance components, wherein:
the step of storing comprises storing said luminance and chrominance components of said successive fields of said color input video signal;
the step of spatially interpolating comprises spatially interpolating said luminance and chrominance components of the selected field to produce respective luminance and chrominance components for the field of said spatially interpolated video signal;
the step of linearly temporally interpolating comprises performing linear temporal interpolation between said luminance and chrominance components of said pair of said successive fields to produce luminance and chrominance components, respectively, for said field of said temporally interpolated video signal;

the step of combining comprises combining said luminance and chrominance components of said spatially interpolated video signal and said temporally interpolated video signal to produce respective luminance and chrominance components for said slow motion video output signal; and the step of comparing comprises comparing said luminance components stored in said successive fields to detect local picture movement.

* * * * *